J. DREXLER & J. HOLLO.
TOY AUTOMOBILE.
APPLICATION FILED NOV. 17, 1917.

1,292,445.

Patented Jan. 28, 1919.
2 SHEETS—SHEET 1.

Inventors
JOHN DREXLER
JOSEPH HOLLO
By their Attorney
Oscar Geier

J. DREXLER & J. HOLLO.
TOY AUTOMOBILE.
APPLICATION FILED NOV. 17, 1917.

1,292,445.

Patented Jan. 28, 1919.
2 SHEETS—SHEET 2.

Inventors
JOHN DREXLER
JOSEPH HOLLO
By their Attorney
Oscar Guier

UNITED STATES PATENT OFFICE.

JOHN DREXLER AND JOSEPH HOLLO, OF TOLEDO, OHIO.

TOY AUTOMOBILE.

1,292,445.　　　　　　Specification of Letters Patent.　　Patented Jan. 28, 1919.

Application filed November 17, 1917.　Serial No. 202,460.

*To all whom it may concern:*

Be it known that I, JOHN DREXLER, a subject of the King of Hungary, resident of Toledo, county of Lucas, and State of Ohio, and I, JOSEPH HOLLO, a subject of the King of Hungary, resident of Toledo, county of Lucas, and State of Ohio, have invented certain new and useful Improvements in Toy Automobiles, of which the following is a specification.

This invention relates to improvements in toy automobiles and particularly to types adapted to be manually operated. The principal object of the invention is to provide a vehicle which may be actuated by the rider and which may be steered in any desired direction.

A further object is to provide seats, combined with vehicles, which are capable of moving longitudinally of the vehicle frame to a limited extent thereby enhancing the novelty of the ride and increasing the propulsion effect given the vehicle.

A still further object is to provide a vehicle which may be used by two persons sitting tandem therein, or which may be extended laterally to provide for four persons.

These and other like objects are attained by the novel construction and combination of parts hereinafter described and shown in the accompanying drawings, forming a material part of this specification, and in which:—

Fig. 3 is a similar longitudinal sectional view taken on line 3—3 of Fig. 1.

Fig. 4 is a top plan view showing a modified form of vehicle construction.

Fig. 5 is a fragmental transverse sectional view taken on line 5—5 of Fig. 4.

Fig. 6 is another fragmental sectional view taken on line 6—6 of Fig. 4, and

Fig. 7 is still another fragmental sectional view taken on line 7—7 of Fig. 4.

Figure 1:
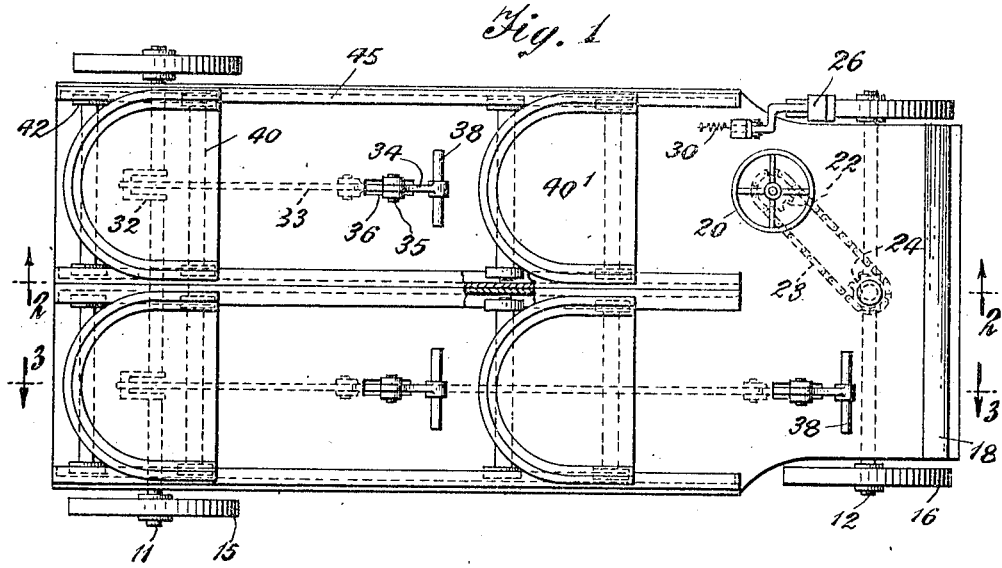
Figure 1 is a top plan view of a vehicle made in accordance with the invention, showing the simplest form thereof.
Figure 2:
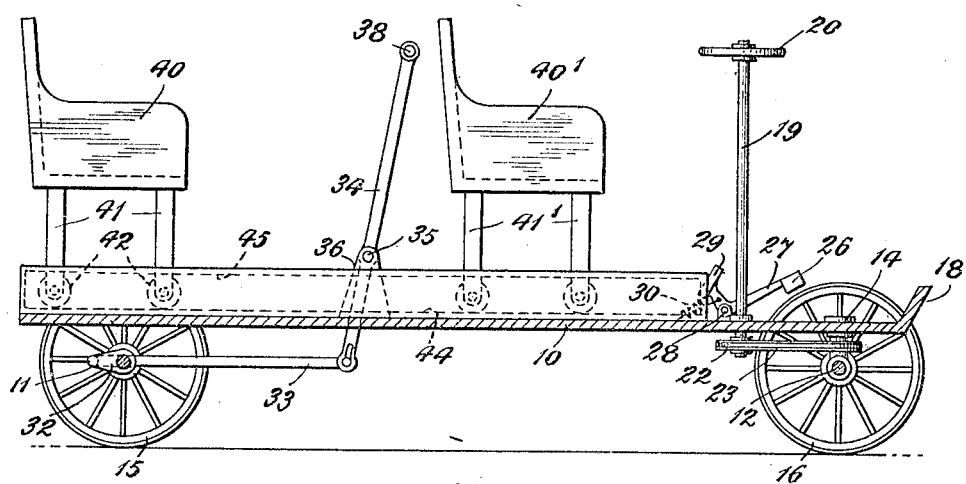
Fig. 2 is a longitudinal sectional view taken on line 2—2 of Fig. 1.

In the form shown in Figs. 1 to 3 inclusive a platform 10, is mounted upon axles 11 and 12 respectively rear and front, the latter having a central rotatable support 14, so as to permit the wheels to be steered, all of the wheels 15 and 16 being alike in their character and rigidly engaged with their axles.

A foot board 18 is at the front of the platform and adjacent is a steering post 19 having an operating wheel 20, being preferably set to one side as is indicated in Fig. 1. Engaged with the lower end of the post 19 is a sprocket wheel 22, transmitting rotary motion through the chain 23 to another sprocket 24, secured upon the pivot 14, in such manner that as the hand wheel 20 is operated the front axle, together with its wheels, may turn in any desired direction.

A contact brake 26, secured to a lever 27, is fulcrumed upon the bracket 28, fixed on the platform 10, the member 29, being operated by the foot of the rider, the brake being normally held out of contact by means of the pull spring 30.

Formed with the axle 11 are cranks 32, engaged with links 33 pivotally connected with the lower end of levers 34, pivoted on the pins 35, mounted in the brackets 36, the levers having operating handles 38 at their extreme upper ends. Rearward of the levers are seats 40 mounted upon standards 41 having engaged rollers 42 at their lower ends, the same resting upon a track-way 44, secured to the platform 10 and held in position by an overhanging rail 45 so that the seats may be moved longitudinally of the platform but held from lateral movement or from displacement.

The rider on the seat 40, operates the handles 38, and can propel the vehicle in any easy and convenient manner. The front seat 40' is similarly arranged rearward of the steering wheel 20. Upon the opposite sides are similar seats operating in a like manner so that three of the riders are able to assist in the propulsion of the vehicle.

In the adaptation shown in Figs. 4 to 7 inclusive, the platform is made in two longitudinal sections, respectively 50 and 52, their contacting edges being slidably engaged together by a tenon 53, engaging in a dovetailed groove 54, the arranement being such as to hold the two portions of the platform rigidly engaged together longitudinally.

In order to prevent one part moving with respect to the other similar dove-tailed grooves 55 are formed transversely across the ends of the platform sections, and engaged with the rear grooves is a tenon 56, formed with a strip 58 the same being level with the platform, while at the front, in the groove 60, is a tenon 62 formed with the foot rest 18, thereby locking the parts substantially together.

From the foregoing it will be seen that if two people are to use the vehicle, one of the sections may be removed and a plain platform (not shown) substituted or if four persons are to use the vehicle the platform will be arranged as indicated in Fig. 4.

Having thus described our invention what we claim as new and desire to secure by Letters Patent, is:—

1. In a manually operable vehicle, the combination with pairs of front and rear truck wheels, of a platform formed of two longitudinal sections, means for engaging said sections together, means for securing said sections to prevent longitudinal movement of one with respect to the other, slidably mounted seats on said platform, cranks formed on the rear axle of the wheels, levers extending through said platform adapted to turn said cranks, said levers being contiguous to said seats and means for steering said vehicle.

2. In a manually operable vehicle, the combination with a pair of platform sections, one of said sections having a tenon and the other of said sections having a groove engageable with said tenon, transverse grooves formed at the ends of both of said sections, elements engageable within said grooves, means for communicating rotary motion to the rear wheels of said vehicle and one or more seats slidably engaged on said platform section whereby said seats are permitted to move longitudinally thereof.

In testimony whereof we have affixed our signatures.

JOHN DREXLER.
JOSEPH HOLLO.

Copies of this patent may be obtained for five cents each, by addressing the "Commissioner of Patents, Washington, D. C."